US009852575B2

(12) United States Patent
Mastropietro et al.

(10) Patent No.: US 9,852,575 B2
(45) **Date of Patent: *Dec. 26, 2017**

(54) SYSTEMS METHODS, AND DEVICES FOR PLAYING WAGERING GAMES WITH SYMBOL CLUMPS AND NON-UNIFORM WEIGHTING OF REEL POSITIONS

(71) Applicant: Bally Gaming, Inc., Las Vegas, NV (US)

(72) Inventors: Michael W. Mastropietro, Chicago, IL (US); Allon G. Englman, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,522

(22) Filed: Jan. 4, 2017

(65) Prior Publication Data

US 2017/0116817 A1 Apr. 27, 2017

Related U.S. Application Data

(63) Continuation of application No. 14/739,420, filed on Jun. 15, 2015, now Pat. No. 9,569,936, which is a (Continued)

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ...... *G07F 17/3213* (2013.01); *G07F 17/3225* (2013.01); *G07F 17/3244* (2013.01); *G07F 17/34* (2013.01); *G07F 17/326* (2013.01)

(58) Field of Classification Search

None

See application file for complete search history.

(56) References Cited

U.S. PATENT DOCUMENTS

| | | | |
|---|---|---|---|
| 4,198,052 | A | 4/1980 | Gauselmann |
| 4,365,810 | A | 12/1982 | Richardson |

(Continued)

FOREIGN PATENT DOCUMENTS

| | | |
|---|---|---|
| AU | 2004-203045 | 7/2004 |
| AU | 2007-254668 | 12/2004 |

(Continued)

*Primary Examiner* — Jason Yen

(74) *Attorney, Agent, or Firm* — Nixon Peabody LLP

(57) ABSTRACT

Gaming devices, gaming systems, methods of conducting wagering games, and computer programs for executing wagering games are disclosed. A gaming system is disclosed which includes one or more processors and one or more memory devices storing instructions that, when executed by at least one of the processors, cause the gaming system to: receive a wager to play a wagering game with symbol-bearing reels, each of which has distinct reel positions populated by various symbols, at least one reel bearing a symbol clump; and, display via a display device a randomly determined outcome of the wagering game. Each wagering-game outcome includes predetermined symbols occupying distinct array positions in a displayed array. Each reel position has a weighted probability of occupying an array position in the array. The weighted probabilities are configured such that the symbol clump, when part of a wagering-game outcome, can only land in its entirety in the array.

20 Claims, 6 Drawing Sheets

Related U.S. Application Data continuation of application No. 13/798,491, filed on Mar. 13, 2013, now Pat. No. 9,098,982.

(56) References Cited

U.S. PATENT DOCUMENTS

| | | | |
|---|---|---|---|
| 4,448,419 | A | 5/1984 | Telnaes |
| 4,661,906 | A | 4/1987 | DiFrancesco et al. |
| 4,858,932 | A | 8/1989 | Keane |
| 5,413,342 | A | 5/1995 | Kaplan |
| 5,580,053 | A | 12/1996 | Crouch |
| 5,609,524 | A | 3/1997 | Inoue |
| 5,611,535 | A | 3/1997 | Tiberio |
| 5,697,843 | A | 12/1997 | Manship et al. |
| 5,704,835 | A | 1/1998 | Dietz, II |
| 5,807,172 | A | 9/1998 | Piechowiak |
| 5,851,148 | A | 12/1998 | Brune et al. |
| 6,004,208 | A | 12/1999 | Takemoto et al. |
| 6,056,642 | A | 5/2000 | Bennett |
| 6,117,009 | A | 9/2000 | Yoseloff |
| 6,159,096 | A | 12/2000 | Yoseloff |
| 6,220,959 | B1 | 4/2001 | Holmes, Jr. et al. |
| 6,241,607 | B1 | 6/2001 | Payne et al. |
| 6,280,328 | B1 | 8/2001 | Holch et al. |
| 6,322,445 | B1 | 11/2001 | Miller |
| 6,394,902 | B1 | 5/2002 | Glavich et al. |
| 6,517,433 | B2 | 2/2003 | Loose et al. |
| 6,604,999 | B2 | 8/2003 | Ainsworth |
| 6,663,487 | B1 | 12/2003 | Ladner |
| 6,676,511 | B2 | 1/2004 | Payne et al. |
| 6,796,903 | B1 | 9/2004 | Bryant |
| 6,910,962 | B2 | 6/2005 | Marks et al. |
| 7,690,984 | B2 | 4/2010 | Tran et al. |
| 8,096,869 | B2 | 1/2012 | Yoshimi |
| 8,105,145 | B2 | 1/2012 | Jaffe |
| 8,235,796 | B2 | 8/2012 | Nakamura |
| 8,251,794 | B2 | 8/2012 | O'Halloran |
| 8,277,307 | B2 | 10/2012 | Jensen et al. |
| 8,287,358 | B2 | 10/2012 | Aoki |
| 2002/0039920 | A1 | 4/2002 | Bryant |
| 2003/0045354 | A1 | 3/2003 | Giobbi |
| 2003/0087687 | A1 | 5/2003 | Locke et al. |
| 2005/0101369 | A1 | 5/2005 | Meyer |
| 2005/0159208 | A1 | 7/2005 | Pacey |
| 2005/0288087 | A1 | 12/2005 | Meyer |
| 2006/0084492 | A1 | 4/2006 | Baerlocher et al. |
| 2008/0194314 | A1 * | 8/2008 | Yoshizawa .............. G07F 17/34 463/20 |
| 2009/0227332 | A1 | 9/2009 | Yoshizawa |
| 2010/0210343 | A1 | 8/2010 | Englman et al. |
| 2011/0201406 | A1 | 8/2011 | Jaffe et al. |
| 2011/0244942 | A1 * | 10/2011 | Aoki ....................... G07F 17/34 463/20 |
| 2012/0115570 | A1 * | 5/2012 | Collette ................ G07F 17/326 463/20 |
| 2013/0184050 | A1 | 7/2013 | Zoble |

FOREIGN PATENT DOCUMENTS

| | | |
|---|---|---|
| AU | 2010-202101 | 5/2010 |
| JP | 2005-192659 | 7/2005 |
| JP | 2009-183679 | 8/2009 |
| WO | WO 95/08799 | 3/1995 |
| WO | WO 2007-089410 | 8/2007 |
| WO | WO 2008/085294 | 7/2008 |

* cited by examiner

SYSTEMS METHODS, AND DEVICES FOR PLAYING WAGERING GAMES WITH SYMBOL CLUMPS AND NON-UNIFORM WEIGHTING OF REEL POSITIONS

CROSS-REFERENCE To RELATED APPLICATIONS

This application is a continuation of U.S. application Ser. No. 14/739,420, filed Jun. 15, 2015, and titled "Systems, Methods, And Devices For Playing Wagering Games With Symbol Clumps And Non-Uniform Weighting Of Reel Positions," now allowed, which is a continuation of U.S. application Ser. No. 13/798,491, filed Mar. 13, 2013, and titled "Systems, Methods, And Devices For Playing Wagering Games With Symbol Clumps And Non-Uniform Weighting Of Reel Positions," now issued as U.S. Pat. No. 9,098,982, each of which is hereby incorporated by reference in its entirety.

COPYRIGHT

A portion of the disclosure of this patent document contains materials which are subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, as well as wagering game devices and gaming systems. More particularly, aspects of the present disclosure relate to systems, methods, and devices for playing slot-type wagering games with reels bearing one or more symbol clumps.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously endeavor to develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "primary" or "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio.

Another concept that has been employed is the use of progressive jackpots. In the gaming industry, a "progressive jackpot" involves collecting coin-in data from participating gaming device(s), such as slot machines, contributing a percentage of that coin-in data to a jackpot amount, and awarding that jackpot amount to a player upon the occurrence of a jackpot-winning event. A jackpot-winning event typically occurs when a "progressive winning position" is achieved at a participating gaming device. If the gaming device is a slot machine, a progressive winning position may, for example, correspond to alignment of progressive jackpot reel symbols along an active payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate.

Conventional slot-type wagering games include a plurality of symbol-bearing reels, each of which has a plurality of distinct reel positions populated by a variety of different types of symbols. Traditionally, slot-type gaming machines display randomly determined outcomes that are represented to the player by select symbols on the symbol-bearing reels, and award players for game outcomes with winning symbols and combinations of symbols in accordance with a pay table. To enhance player entertainment and excitement, some slot-type gaming machines have employed "clumping" of symbols, where groups or "clumps" of the same symbol appear adjacent one another on the same reel. For some implementations, a symbol clump consists of a single, elongated symbol (sometime referred to as a "picture symbol" or "picture clump") that occupies multiple reel positions on the same reel. By occupying multiple adjacent reel positions with one or more of the same symbols, a symbol clump typically increases the likelihood of achieving a winning outcome and, thus, winning a corresponding award.

In general, the number of symbol clumps on any given reel, as well as the respective location and size of each symbol clump, are customarily preset and unchangeable. Moreover, for the cluster of adjacent reel positions occupied by a particular symbol clump, each position typically has the same mathematical probability of occupying an available array position in any given game outcome as the other reel positions that are part of that clump. Some prior art implementations are even configured such that each reel position in a clump has the same mathematical probability of occupying an available array position in a game outcome as any of the other positions on the reel. Like the location and size of a particular clump, the mathematical probability of a given reel position of a symbol clump occupying an available array position in a game outcome is customarily predetermined and fixed. Additionally, given the increased likelihood of a winning outcome, clumps are oftentimes permanently assigned to symbols corresponding to lower award values on the pay table.

Slot games with clumped symbols have become very popular in the gaming industry; as such, game designers are more frequently integrating symbol clumps into new game designs. Research has shown that players prefer symbol clumps that are presented as a picture-type symbol clump as it is believed by players that picture clumps are easier to achieve than other clump arrangements. Picture clumps also help to enhance player anticipation and excitement because they are more readily perceptible to a player while the reels are spinning than standard-sized symbols. Historically, each segment of a picture clump (i.e., each reel position occupied by the clump) has the same probability of landing on a particular array position as the other segments of the clump. With this arrangement, however, many picture clumps have a minimal chance of landing flush in an outcome of the slot game.

There is still a need for additional concepts to enhance the entertainment value of slot-type wagering games. Although a lot of focus is now being paid to enhancing bonus games, there is still room for improving facets of the basic wagering game.

SUMMARY

Aspects of the present disclosure are directed to methods of manipulating slot-type wagering games, namely configuring reel strip layout and/or reel position weightings, so that some or all picture symbols borne by the symbol-bearing reels can only land completely flush (i.e., in its entirety) in the displayed array as part of a game outcome. By ensuring that picture symbols land flush in the displayed array when part of a game outcome, game designers are provided with a whole new element of game play that was previously not available in the art. Elements such as conferring awards for completing a full picture across multiple/all reels of the game outcome now have a greater probability of occurring. Moreover, by guaranteeing that picture symbols will land flush in the displayed array, game designers can develop games features where picture symbols interact with one another. For instance, if two picture symbols with respective warrior pictures land next to each other on the reels a fight could commence on the reel layout.

According to one aspect of the present disclosure, a gaming system for conducting a wagering game is disclosed. The gaming system includes one or more processors and one or more memory devices. The memory device(s) stores instructions that, when executed by at least one of the one or more processors, cause the gaming system to: receive an indication of a wager to play the wagering game, the wagering game including a plurality of symbol-bearing reels, each of which has a plurality of distinct reel positions populated by a plurality of symbols, at least one of the reels bearing a symbol clump that occupies two or more immediately adjacent reel positions on the at least one reel; and, direct at least one display device to display an outcome of the wagering game, the displayed outcome being randomly determined from a plurality of wagering-game outcomes. Each wagering-game outcome includes predetermined ones of the symbols occupying a plurality of distinct array positions arranged in an array displayed via the at least one display device. One or more or all of the reel positions on the at least one reel has a corresponding weighted probability of occupying corresponding ones of the array positions in the displayed array. The weighted probabilities are configured such that the symbol clump, when part of one of the wagering-game outcomes, can only land in its entirety in the array.

In accordance with another aspect of the disclosure, one or more physical non-transitory machine-readable storage media are featured which include instructions which, when executed by one or more processors, cause the one or more processors to perform operations comprising: receive an indication of a wager to play a wagering game, the wagering game including a plurality of symbol-bearing reels, each of which has a plurality of distinct reel positions populated by symbols, at least one of the reels having a symbol clump occupying two or more immediately adjacent ones of the reel positions on the at least one reel; randomly determine an outcome of the wagering game from a plurality of wagering-game outcomes, each of the wagering-game outcomes including predetermined ones of the symbols occupying a plurality of distinct array positions arranged in an array displayed on a display device; and, direct the display device to display the outcome of the wagering game. One or more or all of the reel positions on the at least one reel has a corresponding weighted probability of occupying corresponding ones of the array positions in the displayed array. The weighted probabilities are configured such that the symbol clump, when part of one of the wagering-game outcomes, can only land in its entirety in the array.

Other aspects of the present disclosure are directed to a method of conducting a wagering game with a gaming system. The gaming system includes one or more input devices, one or more display devices, and one or more processors. The method includes: receiving, via at least one of the one or more input devices, an indication of a wager to play the wagering game, the wagering game including a plurality of symbol-bearing reels, each of the reels having a plurality of distinct reel positions populated by a plurality of symbols, at least one of the reels having a symbol clump occupying two or more immediately adjacent ones of the reel positions on the at least one reel; randomly determining, via at least one of the one or more processors, an outcome of the wagering game from a plurality of wagering-game outcomes, each of the wagering-game outcomes including predetermined ones of the symbols occupying a plurality of distinct array positions arranged in an array displayed via at least one of the one or more display devices; and displaying, via at least one of the one or more display devices, the outcome of the wagering game. One or more or all of the reel positions on the at least one reel has a corresponding weighted probability of occupying corresponding ones of the array positions in the displayed array, the weighted probabilities being configured such that the symbol clump, when part of one of the wagering-game outcomes, can only land in its entirety in the array.

Another aspect of this disclosure is directed to non-transitory computer-readable storage media that includes instructions which, when executed by one or more processors, cause the one or more processors to perform operations comprising: receive an indication of a wager to play a wagering game, which includes symbol-bearing reels each having a plurality of distinct reel positions populated by a variety of different symbols, at least one of the reels having at least one symbol clump that consists of a single enlarged symbol occupying two or more immediately adjacent reel positions on the reel; randomly determine an outcome of the wagering game from a plurality of wagering-game outcomes, each wagering-game outcome including predetermined ones of the symbols occupying a plurality of distinct array positions arranged in an array displayed on a display device; and, direct the display device to display the outcome of the wagering game. The adjacent reel positions occupied by the symbol clump, as well as the neighboring reel positions immediately above and immediately below the symbol clump, each has a corresponding weighted probability of occupying corresponding ones of the array positions in the displayed array. These weighted probabilities are configured such that the symbol clump, when part of a wagering-game outcome, can only land in its entirety in the array.

Other aspects of this disclosure is directed to non-transitory computer-readable storage media that includes instructions which, when executed by one or more processors, cause the one or more processors to perform operations comprising: receive an indication of a wager to play a wagering game, which includes a plurality of symbol-bearing reels each having a plurality of distinct reel positions populated by a variety of different symbols, at least one of the reels has at least one symbol clump that consists of a single enlarged symbol occupying two or more immediately adjacent reel positions on the reel; randomly determining an outcome of the wagering game from a plurality of wagering-game outcomes, each of which includes predetermined ones of the symbols occupying a plurality of distinct array positions arranged in an array displayed on a display device; and, directing the display device to display the outcome of the wagering game. The array positions are arranged in rows and columns. The clump-bearing reel is aligned with one of the columns. The symbol clump occupies X-total-number of the adjacent reel positions, and the length of the respective column is Y-total-number of the array positions. An upper-most one of the adjacent reel positions of the symbol clump, when part of one of the wagering-game outcomes, is restricted to occupying an upper-most one of the array positions in the respective column and the N array position/positions immediately below the upper-most array position. In this embodiment, X is less than or equal to Y, and N=Y−X.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

Figure 1:
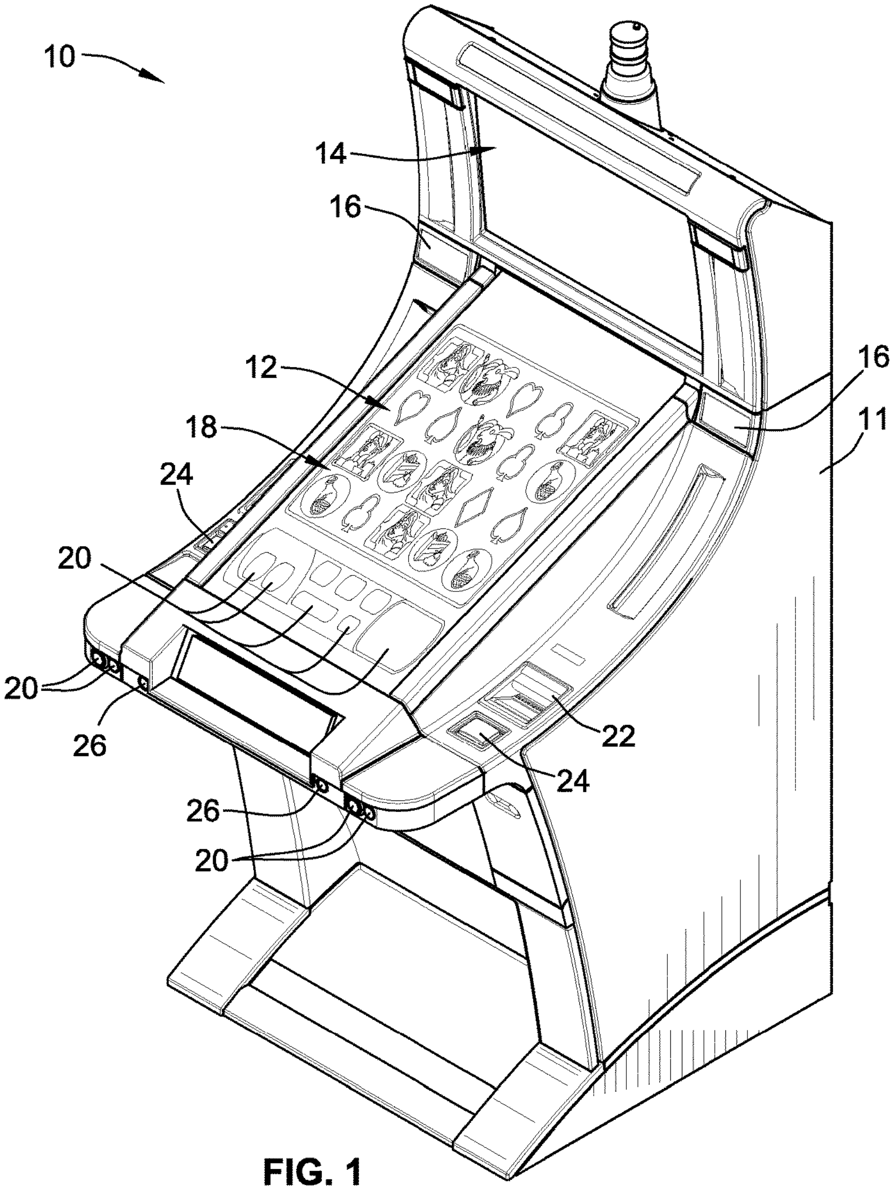
FIG. 1 is a perspective-view illustration of an example of a free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 may be any type of gaming terminal and may have varying structures and methods of operation. For example, in some aspects, the gaming terminal 10 is an electromechanical gaming terminal configured to play slots with mechanical reels, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models (as shown), handheld mobile devices, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, U.S. Patent Application Pub. Nos. US2010/0069160 and 2010/0234099, and International Application No. PCT/US2007/000792, all of which are incorporated herein by reference in their respective entireties and for all purposes.

The gaming terminal 10 illustrated in FIG. 1 comprises a cabinet 11 that may house various input devices, output devices, and input/output devices. By way of non-limiting example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display may be disposed in front of the mechanical-reel display to portray a video image superimposed upon the mechanical-reel display. The display areas may variously display information associated with wagering games, non-wagering games, community games, progressive games, advertisements, services, premium entertainment, text messaging, emails, alerts, announcements, broadcast information, subscription information, etc., appropriate to the particular mode(s) of operation of the gaming terminal 10. The gaming terminal 10 includes a touch screen(s) 18 mounted over the primary and/or secondary areas 12, 14, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals can be selected from a group consisting essentially of an electrical current, an electrical voltage, an electrical charge, an optical signal, an optical element, a magnetic signal, and a magnetic element.

Figure 2:
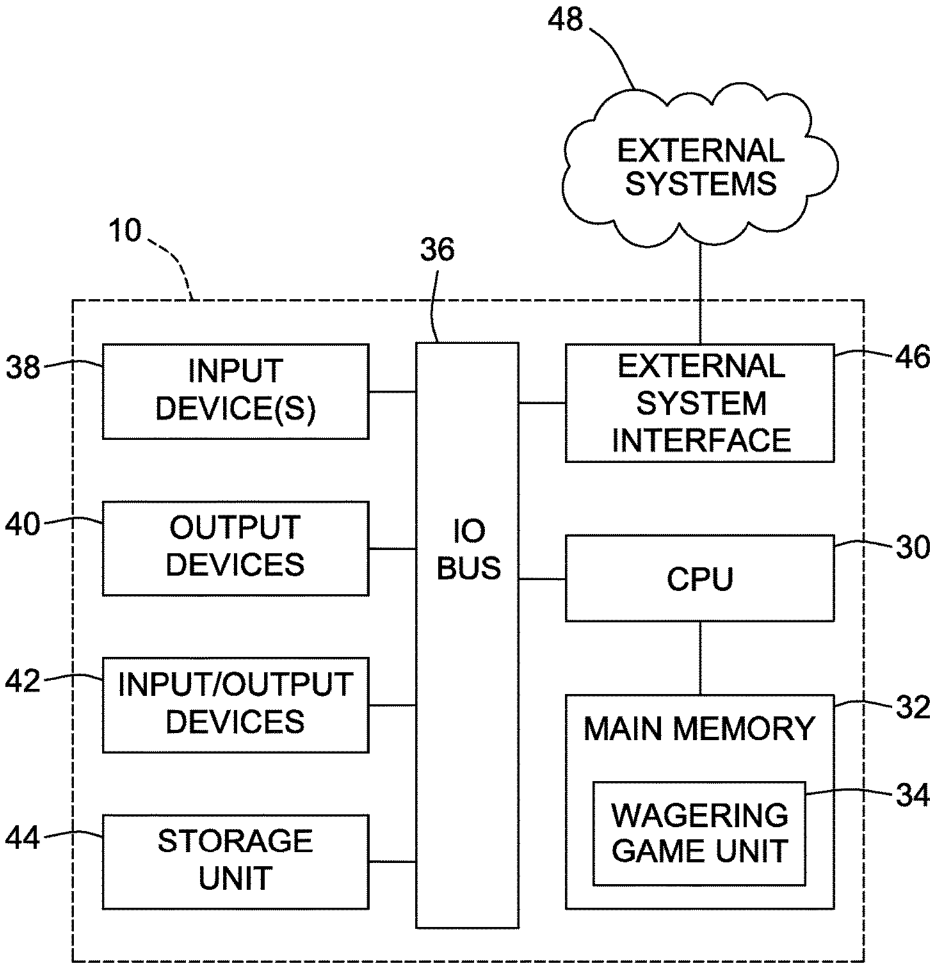
FIG. 2 is a schematic diagram of an example of a gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes a random number generator (RNG) for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
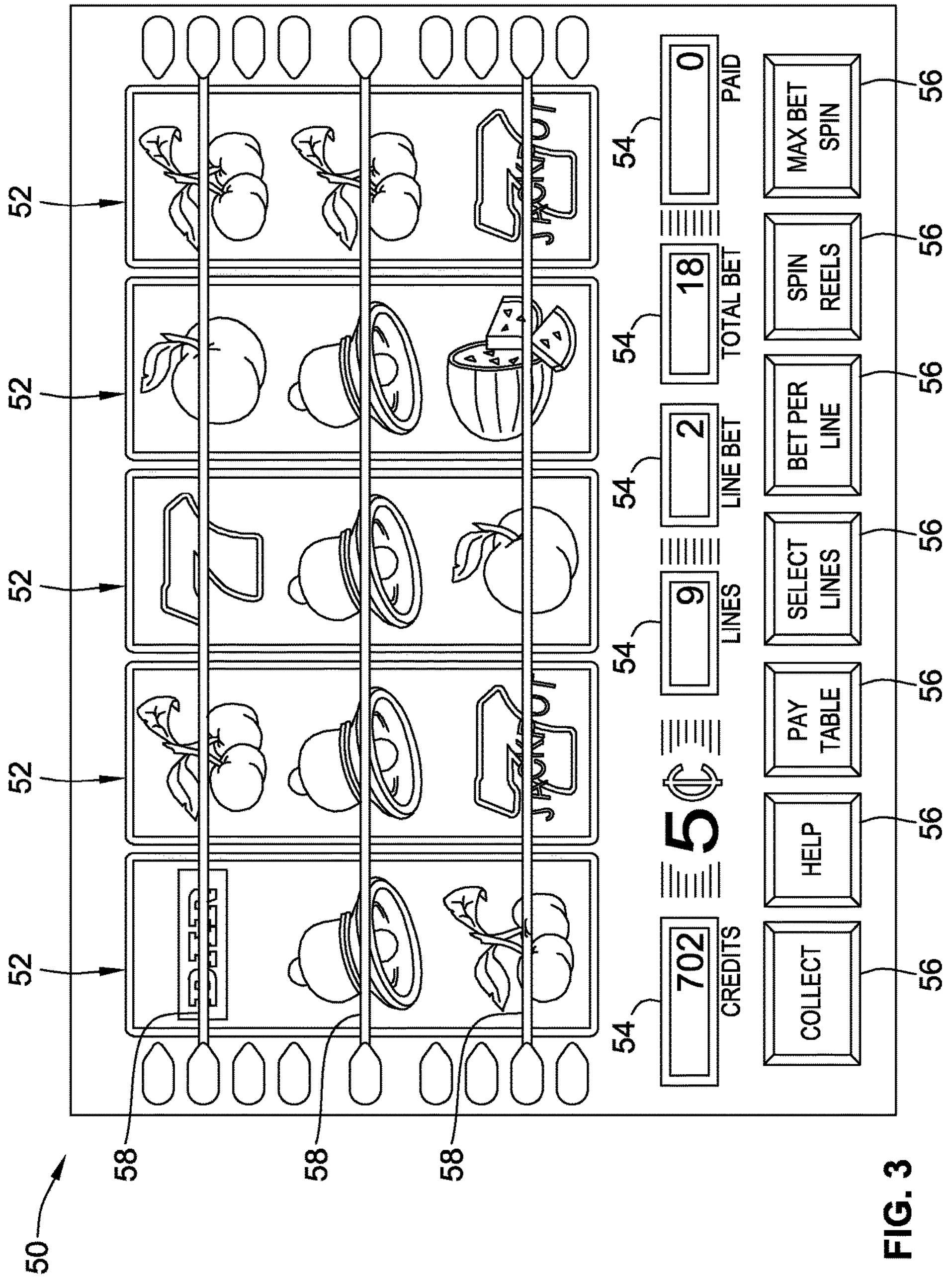
FIG. 3 is a screen shot of a representative basic-game screen of a wagering game displayed on a gaming terminal, gaming device, and/or gaming system according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by an RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
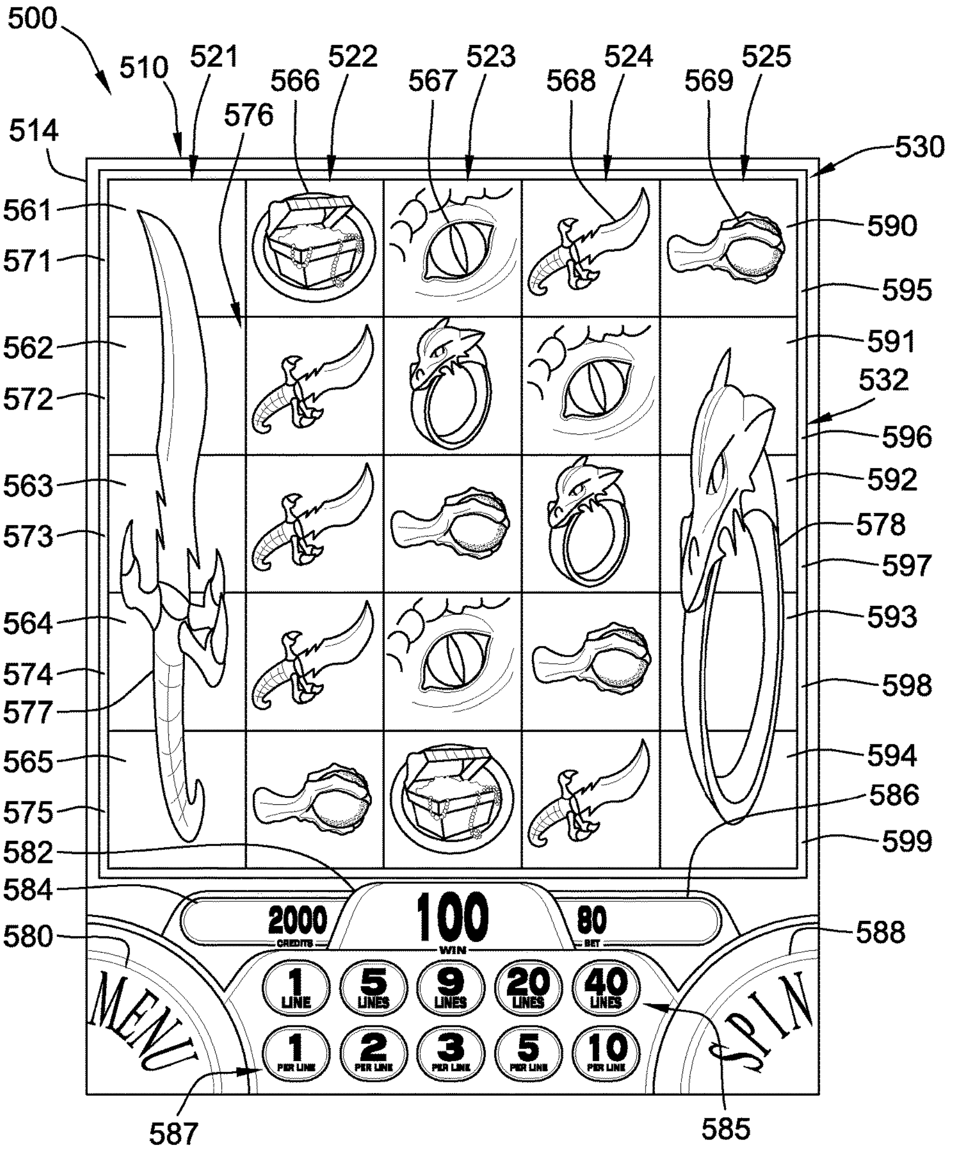
FIG. 4 is a screen shot of a representative game screen of an exemplary wagering game with symbol clumps and non-uniform weighting of reel positions in accordance with aspects of the present disclosure.

FIG. 4 is a screen shot of a game screen from an exemplary wagering game in accordance with aspects of the present disclosure. A primary display 514 of a gaming device or terminal 510, which may be part of an exemplary gaming system 500, is shown in FIG. 4. The gaming terminal 510 and gaming system 500 may be similarly configured to the gaming terminal and gaming system shown in FIGS. 1 and 2, respectively, and therefore may include any of the corresponding options, alternatives and features disclosed above. In this regard, the gaming terminal 510 of FIG. 4 can take on various alternative configurations, including, without limitation, upright freestanding gaming machines, slant-top freestanding gaming machines, hand-held and portable gaming devices, countertop gaming machines, personal computers and laptop computers, smartphones, tablet computers, or other known gaming devices, individually or in any combination thereof. The primary display device 514 of the gaming terminal 510 displays wagering games, such as those described above with respect to FIGS. 1-3 or those described below with respect to FIGS. 4-6, for example. The display device 514 may be any form of display, such as those described with reference to the free-standing gaming terminal 10 of FIG. 1. For instance, the primary display 514 may comprise a plasma, LED, OLED, LCD, CRT, projection, or any other now-known or later-developed display device. Although numerous aspects of the wagering game 530 are all shown displayed on a single display device, namely the primary display 514, these aspects are not so limited and can be displayed in any combination on any number of display devices unless otherwise expressly prohibited.

The display device 514 displays or otherwise visually depicts a wagering game 530, which in this example is the slot game shown in FIG. 4. The slot game 530 includes a plurality of symbol-bearing reels, designated generally as 521-525 in FIG. 4, each having a plurality of distinct reel positions (collectively represented in FIG. 4 by five reel positions 561-565 on the first reel 521 and five reel positions 590-594 on the fifth reel 525) and bearing a number of symbols (collectively represented in FIG. 4 by four standard-sized symbols 566-569 and two picture symbols 577 and 578). The reels 521-525 may be electro-mechanical reels, computer-generated simulations of reels, other replicated forms of reels, or any variation thereof. The symbols may include any variety of graphical symbols, emblems, elements, or representations, including symbols that are associated with one or more themes of the gaming terminal 510 and gaming system 500 (e.g., a Dragon Slayers theme). The symbols may also include a blank symbol or empty space.

As indicated above, each of the reels 521-525 has a plurality of distinct reel positions populated by a variety of different symbols. As used herein, the term “reel position” can be defined to mean a predetermined location on a reel (or on a reel strip borne by a mechanical reel) to which is assigned at least one symbol that is evaluated for winning outcomes when part of a wagering-game outcome. As seen in the embodiment illustrated in FIG. 5, for example, the first reel 521 has a reel strip 521A with 20 individual reel positions, which are respectively designated as positions 1A-20A; the second reel 522 has a reel strip 522B with 20 individual reel positions, which are respectively designated as positions 1B-20B; the third reel 523 has a reel strip 523C with 20 individual reel positions, which are respectively designated as positions 1C-20C; the fourth reel 524 has a reel strip 524D with 20 individual reel positions, which are respectively designated as positions 1D-20D; and the fifth reel 525 has a reel strip 525E with 20 individual reel positions, which are respectively designated as positions 1E-20E. Recognizably, the reels may be individually or collectively varied to comprise fewer or greater than 20 reel positions without departing from the scope and spirit of the present disclosure. Moreover, the illustrated reel strips 521A, 522B, 523C, 524D, 525E can take on any known form of reel strip, be it virtual, e.g., computer-generated for electronic gaming machines (EGM), tangible, e.g., screen-printed for electro-mechanical gaming machines, or otherwise.

The symbols on the reels 521-525, when part of a wagering-game outcome, are arranged in an array 532, which in this embodiment is a 5×5 matrix—five rows by five columns—of distinct array positions displayed via the display device 514 (25 total array positions in FIG. 4, collectively represented by five array positions 571-575 occupied by the first reel 521 and five array positions 595-599 occupied by the fifth reel 525). By way of comparison to the aforementioned reel position, the term “array position,” as used herein, can be defined to mean a predetermined location in a displayed array (or in a window of an electro-mechanical machine) within which (or through which) is shown at least one reel symbol when such symbol is part of a randomly selected outcome of the wagering game. Unlike a reel position, an array position is typically not borne by, nor movable with, a symbol-bearing reel. The reels 521-525 are varied (e.g., spun and stopped) to reveal combinations of symbols in the array 532, which represent randomly selected outcomes of the wagering game 530, that are evaluated for winning symbol combinations. Winning combinations of symbols landing, for example, on activated paylines (e.g., those paylines for which a wager has been received) which extend through the array positions, cause awards to be paid in accordance with one or more pay tables associated with the wagering game 530. In some embodiments, winning combinations of symbols include three or more like symbols aligned adjacent one another on an active pay line (e.g., left-to-right configuration, right-to-left configuration, or both). In some embodiments, symbol combinations are evaluated in accord with various other schemes such as, but not limited to, scatter pays.

Some of the symbols in the wagering game 530 can be grouped into a corresponding clump of symbols. The term “clump” or “symbol clump” refers to one or more of a single type of symbol occupying two or more reel positions that are located immediately adjacent one another on a single reel. By way of example, and not limitation, a “standard” symbol clump can consist of multiple identical symbols occupying multiple immediately adjacent reel positions on a single reel. One non-limiting example can be seen on the second reel 522 in FIG. 4, which has a symbol clump designated generally at 576 that comprises three “dagger” symbols 568 occupying three adjacent reel positions on the reel 522. Alternatively, a “picture” symbol clump can consist of a single, elongated or enlarged symbol that occupies multiple immediately adjacent reel positions on a single reel. Non-limiting examples of picture-type symbol clumps can be found at 577 on the first reel 521 and at 578 on the fifth reel 525 of FIG. 4. Clump 577 consists of a single dagger symbol that occupies five immediately adjacent reel positions on the first feel 521. Comparatively, clump 578 consists of a single ring symbol that occupies four immediately adjacent reel positions on the first feel 521. In yet a further optional arrangement, a clump may comprise one or more picture clumps in combination with one or more corresponding standard-sized symbols that occupy numerous reel positions that are all immediately adjacent one another on a single reel. In some embodiments, each array position filled by a portion of a symbol clump is evaluated in the same manner as if a single symbol of that type were occupying that position. However, by filling multiple adjacent reel positions with one or more of the same symbols, a symbol clump typically increases the likelihood of achieving a particular winning outcome and corresponding award for that symbol type. In other embodiments, each of the symbol clumps is evaluated as a unitary element in determining whether a game outcome represents a winning outcome.

Within the scope of this disclosure, the wagering game 530 can include greater or fewer than five symbol-bearing reels (simulated, mechanical, or otherwise) and, in some embodiments, greater or fewer array positions than the 25 array positions shown in FIG. 4. In this regard, the randomly selected outcomes may comprise greater or fewer than 25 symbols, and may take on a variety of different forms having greater or fewer rows and/or columns. The matrix may even comprise other non-rectangular forms or arrangements of symbols. Moreover, the randomly selected outcomes of the wagering game 530 may be varied from the representation provided in FIG. 4. Likewise, the Dragon Slayers game theme is purely illustrative and non-limiting in nature.

The primary display 514 further includes certain display features for providing information and options to a player. For example, the display 514 features may include a MENU button 580, a WIN meter 582, a CREDITS meter 584, and a BET meter 586. The MENU button 580 can be pressed and activated (e.g., through an overlying touch screen) by a player desiring to access other control menus, preferences, help screens, informational menus, etc. For example, the player can change a theme of the wagering game 530 via the MENU button 580, or change the type of the wagering game (e.g., to video poker, keno, etc.). The WIN meter 582 displays to the player the amount of the total win (if any) from the most recent play of the wagering game 530. The CREDITS meter 584 displays to the player the total amount of credits (if any) remaining and available to the player for play of the wagering game 530. The BET meter 586 displays to a player the current size of his/her wager (in credits). Once a number of paylines are selected and a wager is placed, a SPIN button 588 can be pressed or otherwise activated by a player to effectuate rotation of the reels 521-525. In an optional configuration, selection of a SPIN button will effectuate rotation of the reels 521-525 without requiring prior selection of a wager and/or a number of paylines (e.g., a default wager and a default number of payline(s) are automatically chosen upon selection of the SPIN button 588).

Fewer, additional, or alternative display features may be included for presenting information and/or options to a player. In one specific instance, a row of player-selectable LINES buttons 585 can be provided to give players the option of quickly selecting and activating a predetermined number of paylines (e.g., 1, 5, 9, 20 or 40 lines in FIG. 4). Another option would be to display a row of player-selectable bet PER LINE buttons 587, which gives a player the option of quickly selecting a predetermined bet per active payline (e.g., 1, 2, 3, 5 and 10 credits per activated payline in FIG. 4). The primary display 514 can also include, for example, an optional CHANGE DENOM button that can be utilized to change the denomination of each wagered credit (e.g., from 1¢ per credit to 25¢ per credit) which the player is inputting into the system 500. Other features may include, in some non-limiting examples, one or more bet change buttons that permit a player to incrementally increase and/or decrease the size of his/her wager, a MAX BET SPIN button (not shown) for wagering a maximum number of credits and contemporaneously varying the reels of the wagering game 530, as well as any of the other buttons and meters presented herein or other features now known or hereinafter developed.

The wagering game 530 is shown in FIG. 4 after play of a base game segment is initiated, for example, by the player providing a wager (e.g., responsive to an input via at least one input device), and thereafter pressing a spin button or pulling a spin lever. The monetary wager, which is typically a selected number of credits, is deducted from the available credits, e.g., the 2000 credits displayed via the CREDITS meter 584 in FIG. 4. The monetary wager that is in play (e.g., 80 credits in FIG. 4) can be displayed via the BET meter 586. The reels 521-525 may then be varied (e.g., spun and stopped); the reels 521-525 continue to spin until they are stopped to reveal in the displayed array 532 reel symbols which represent a randomly selected outcome of the wagering game 530. The wagering-game outcome is, according to some aspects, randomly determined from a plurality of potential wagering-game outcomes. As indicated above, each outcome is evaluated for winning symbol combinations to determine if the displayed outcome has one or more awards associated therewith. In alternate embodiments, FIG. 4 can be representative of a bonus game segment of the wagering game 530.

A local controller (e.g., CPU 30 of FIG. 2), a host system (e.g., external system 48 of FIG. 2), a central controller, or any combination thereof, in alternative embodiments, operates to execute the wagering game program causing the display area 514 to display selected portions of the wagering game 530. An outcome of the wagering game 530, be it for a base portion, a bonus portion, a progressive portion, a community portion, or otherwise, can be randomly selected from a predetermined set of potential wagering-game outcomes, for example, using a local random number generator (RNG). The wagering-game outcome is then revealed, displayed, or otherwise communicated to the player, for example, on a corresponding display device 514. The game screen 514 displays the wagering-game outcome by portraying the plurality of simulated reels 521-525 spinning and stopping to reveal reel symbols arranged in a 5-row, 5-column matrix—i.e., symbol array 532. A winning combination occurs, for example, when the displayed symbols correspond to one or more of the winning symbol combinations listed in a predetermined pay table. In response to a winning outcome, a wagering-game prize (e.g., a monetary award of credits) associated with a winning outcome is conferred upon the player.

For one, some or all of the reels 521-525, namely those reels bearing a symbol clump, and ideally at least those reels bearing a picture clump, each reel position is assigned a weighted probability of occupying one or more of the corresponding array positions in the displayed array in an outcome of the wagering game. By way of clarification, the first reel position 1A of the first reel 521 of FIG. 5 can be assigned: a first probability of occupying the second array position 572 in the array 532 for any possible outcome of the wagering game 530; a second probability of occupying the third array position 573 in the array 532 for any possible outcome of the wagering game 530; a third probability of occupying the fourth array position 574 in the array 532 for any possible outcome of the wagering game 530; and/or, a fourth probability of occupying the fifth array position 575 in the array 532 for any possible outcome of the wagering game 530. In the illustrated example, the first reel position 1A of the first reel 521 is not assigned a probability of occupying the first array position 571 in the array 532. In a similar manner, the second reel position 2A of the first reel 521 can be assigned a respective probability of occupying one or more of the first five array positions 571-575 in the array 532 (e.g., the third, fourth and fifth array positions 573-575), while the third reel position 3A of the first reel 521 can be assigned a respective probability of occupying one or more of the array positions 571-575 in the array 532 (e.g., the fourth and fifth array positions 574-575), and so on for all 20 reel positions 1A-20A of the first reel 521. Weighted probabilities of occupying the first five array positions 571-575 of the displayed array 532 are only assigned to the reel positions of the first reel 521 since, in the illustrated embodiment, only the symbols of the first reel 521 can populate the first five array positions 571-575 in outcomes of the wagering game 530.

Figure 5:
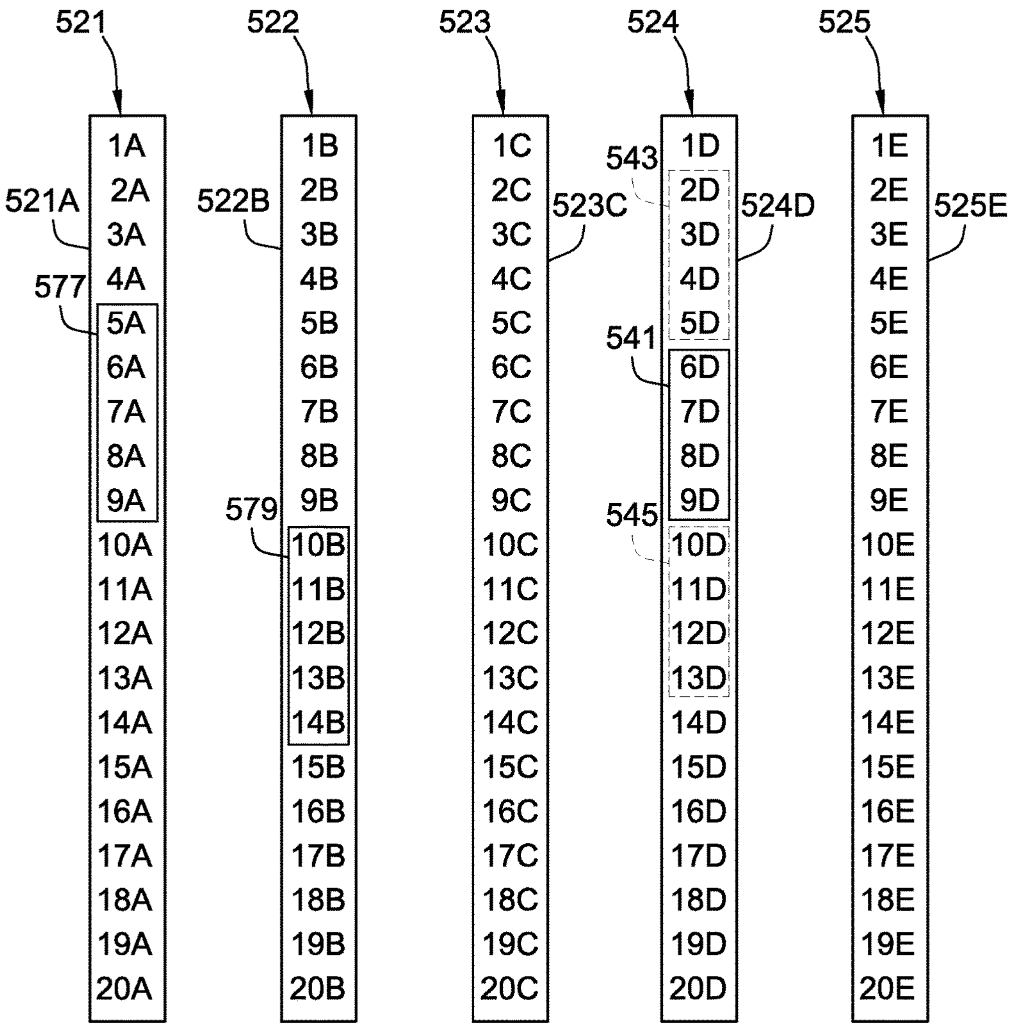
FIG. 5 is a schematic illustration of the exemplary wagering game of FIG. 4.

Similar to the reel positions of the first reel 521, the first reel position 1B of the second reel 522 of FIG. 5 can be assigned a respective probability of occupying one or more or all of the five array positions in the second column of the array 532 for any possible outcome of the wagering game 530. Likewise, the second reel position 2B of the second reel 522 can be assigned a respective probability of occupying one or more or all of the five array positions in the second column of the array 532, the third reel position 3B of the second reel 522 can be assigned a respective probability of occupying one or more or all of the five array positions in the second column of the array 532, and so on for all 20 reel positions 1B-20B of the second reel 522. However, the reel positions 5B-19B can be assigned a respective probability of occupying only certain one or ones of the array positions in the second column of the array 532, as will be developed in further detail below. As explained above, weighted probabilities of occupying the five array positions in the second column of the array 532 are only assigned to the reel positions of the second reel 522 since, in the illustrated embodiment, only the symbols of the second reel 522 can populate the second column of the array 532 in outcomes of the wagering game 530. A similar process can be completed for the third, fourth, and/or fifth reels 523-525. For some optional configurations, the above-described assigning of weighted probabilities can be carried out for only those reels that carry picture clumps, for only those reels that carry a symbol clump of any type, or for only a select one or ones of the reels.

In accord with the disclosed concepts, the weighted probabilities assigned to the symbol positions of each reel with at least one symbol clump are configured such that a symbol clump, when part of one of the wagering-game outcomes, can only land in its entirety in the array. For some implementations, only the weighted probabilities assigned to reels with at least one picture clump are configured such that a picture clump, when part of one of the wagering-game outcomes, can only land in its entirety in the array. By ensuring that picture symbols land flush (i.e., in its entirety) in the displayed array when part of a game outcome, game designers are provided with a whole new element of game play that was previously not available in the art. Elements such as conferring awards for completing a full picture across multiple/all reels of the game outcome now have a greater probability of occurring. Moreover, by guaranteeing that picture symbols will land flush in the displayed array, game designers can develop games features where picture symbols interact with one another. For instance, if two picture symbols with respective warrior pictures land next to each other on the reels, a fight could commence on the reel layout.

The weighted probabilities assigned to the reel positions can be manipulated in various ways to achieve the above-mentioned objective. In one embodiment, wherein the array positions are arranged in rows and columns (e.g., five rows and five columns in FIG. 4), and each symbol-clump-bearing reel is aligned with a respective one of the columns, each symbol clump occupies X-total-number of the adjacent reel positions on the reel, and a length of the corresponding column associated with that reel is Y-total-number of the array positions long. For instance, the first reel 521 of FIG. 4 is aligned with the first column of the displayed array 532, the first column consisting of five (5) array positions 571-575. The first reel 521 also bears a picture clump 577 that occupies five (5) adjacent reel positions 561-565 on the reel 521. Likewise, the second reel 522 is aligned with the second column of the displayed array 532, which also consists of five (5) array positions, and bears a symbol clump 576 that occupies three (3) adjacent reel positions on the reel 522. The fifth reel 525 of FIG. 4 is aligned with the fifth column of the displayed array 532, also consisting of five (5) array positions, and bears a picture clump 578 that occupies four (4) adjacent reel positions on the reel 525.

To ensure that a clump only lands in its entirety in the array when part of a wagering-game outcome, the upper-most reel position occupied by a symbol clump is restricted to occupying the upper-most array position in the corresponding column of the array and the N array position/positions immediately below the upper-most array position, where N=Y−X. For some preferred embodiments, the total number of reel positions occupied by a clump X must be less than or equal to the total number of array positions in the column of the array Y corresponding to the reel bearing that clump. Referring again to the example illustrated in FIG. 4, the upper-most reel position occupied by the picture clump 577 is reel position 561. To ensure that the picture clump 577 only lands in its entirety in the array 532 when part of a wagering-game outcome, the reel position 561 must always land in the first array position 571 of the first column of the array 532, or not at all. Since the picture clump 577 occupies 5-total-number of the adjacent reel positions (X=5), and the first column is 5-total-number of the array positions long (Y=5), N=0 in this example. Thus, the upper-most reel position 561 of the picture clump 577 cannot land in the second, third, fourth or fifth array positions 572-575. As an extension of this concept, the reel positions 562-565, which are also occupied by the picture clump 577, can never land in the first array position 571.

As another example, the upper-most reel position occupied by the picture clump 578 on the fifth reel 552 in FIG. 4 is reel position 591. To ensure that the picture clump 578 only lands in its entirety in the array 532 when part of a game outcome, the reel position 591 must land in either the first array position 595 or the second array position 596 of the fifth column of the array 532. In contrast to the picture clump 577, the upper-most reel position 591 of the picture clump 578 can land in the second array position 596, which is one array position immediately below the upper-most array position 595 of the fifth column of array 532, because the symbol clump 578 occupies 4 adjacent reel positions (X=4), the fifth column is 5 array positions long (Y=5), and N=1 in this example. Thus, the reel position 561 cannot land in the third, fourth or fifth array positions 597, 598, 599. As an extension of this concept, the reel positions 592-594, which are also occupied by the picture clump 578, can never land in the first array position 595.

A similar rule can be applied to the lower-most reel position occupied by a clump: to ensure that a clump only lands in its entirety in the array when part of a wagering-game outcome, the lower-most reel position occupied by a symbol clump is restricted to occupying the lower-most array position in the corresponding column and the N array position/positions immediately above the lower-most array position, where N=Y−X. To ensure that the picture clump 577 only lands in its entirety in the array 532 when part of a wagering-game outcome, for example, the "lower-most" reel position 565 of the clump 577 must always land in the fifth array position 575 of the first column of the array 532, or not at all. As another example of this concept, to ensure that the picture clump 578 only lands in its entirety in the array 532 when part of a game outcome, the "lower-most" reel position 594 of the clump 578 must land in either the fourth array position 598 or the fifth array position 599 of the fifth column of the array 532. By following these rules, a game designer can help to ensure that a picture clump will land flush in the displayed array when part of a game outcome.

For some embodiments, wherein the array positions are arranged in rows and columns (e.g., five rows and five columns in FIG. 4), and each symbol-clump-bearing reel is aligned with a respective one of the columns, the total number of adjacent reel positions occupied by a symbol clump is equal to the total number of the array positions in the corresponding column of that reel. For instance, the first reel 521 of FIG. 4 is aligned with the first column of the array 532, which consists of five (5) array positions 571-575. The first reel 521 also bears a picture clump 577 that occupies five (5) adjacent reel positions 561-565 on the reel 521. In this example, X=Y for picture clump 577. In some optional configurations, the total number of adjacent reel positions occupied by each picture clump is equal to the total number of adjacent reel positions occupied by the other picture clumps, which are also equal to the total number of the array positions in the corresponding column of that reel. With reference again to FIG. 5, for example, the picture clump 577 on the first reel 521 occupies 5 adjacent reel positions 5A-9A and the second reel 522 bears a picture clump 579 that occupies five (5) adjacent reel positions 10B-14B on the reel 522. As seen in of FIG. 4, the second reel 522 is aligned with the second column of the array 532, which consists of five (5) array positions.

Continuing with this embodiment, to ensure that a clump only lands in its entirety in the array when part of a wagering-game outcome, a top neighboring reel position immediately above the symbol clump on the same reel, when part of one of the wagering-game outcomes, can never occupy an upper-most one of the array positions in the column with which that reel is aligned. For instance, reel position 4A is the top neighboring reel position immediately above the picture clump 577 on reel 521. To ensure that the picture clump 577 always lands flush in the array 532, the reel position 4A can never occupy the first array position 571 in the first column of the array 532. In a similar regard, to ensure that the picture clump 579 always lands flush in the array 532, the reel position 9B, which is the top neighboring reel position immediately above the picture clump 579 on reel 522, can never occupy the first array position in the second column of the array 532.

As an extension of the above concept, another way to ensure that a clump only lands in its entirety in the array when part of a wagering-game outcome, a bottom neighboring reel position immediately below the symbol clump on the same reel, when part of one of the wagering-game outcomes, can never occupy a lower-most one of the array positions in the column with which that reel is aligned. For instance, reel position 10A is the bottom neighboring reel position immediately below the picture clump 577 on reel 521. To ensure that the picture clump 577 always lands flush in the array 532, the reel position 10A can never occupy the last array position 575 in the first column of the array 532. In a similar regard, to ensure that the picture clump 579 always lands flush in the array 532, the reel position 15B, which is the bottom neighboring reel position immediately below the picture clump 579 on reel 522, can never occupy the last array position in the second column of the array 532.

As a further extension of the above concept, another way to ensure that a clump only lands in its entirety in the array when part of a wagering-game outcome, a bottom neighboring reel position immediately below the symbol clump on the same reel, when part of a wagering-game outcome, must occupy an upper-most one of the array positions in the respective column. For instance, to ensure that the picture clump 577 always lands flush in the array 532, the reel position 10A, which is the bottom neighboring reel position immediately below the picture clump 577 on reel 521, must occupy the first array position 571 in the first column of the array 532 when part of a game outcome. Similarly, to ensure that the picture clump 579 always lands flush in the array 532, the reel position 15B, which is the bottom neighboring reel position immediately below the picture clump 579 on reel 522 of FIG. 5, must always occupy the first array position in the second column of the array 532.

As yet another extension of the above concept, an alternative way to ensure that a clump only lands in its entirety in the array when part of a wagering-game outcome, a top neighboring reel position immediately above the symbol clump on the same reel, when part of one of the wagering-game outcomes, must occupy a lower-most one of the array positions in the respective column. By way of example, to ensure that the picture clump 577 always lands flush in the array 532, the reel position 4A, which is the top neighboring reel position immediately above the picture clump 577 on reel 521, must occupy the last array position 575 in the first column of the array 532 when part of a game outcome. Likewise, to ensure that the picture clump 579 always lands flush in the array 532, the reel position 9B, which is the top neighboring reel position immediately above the picture clump 579 on reel 522 of FIG. 5, must always occupy the last array position in the second column of the array 532. By following any of the above rules, a game designer can help to ensure that a picture clump does not land only partially in the displayed array when part of a game outcome.

In accordance with other aspects of the present disclosure, the exemplary wagering game 530 of FIG. 4 includes, prior to displaying one or more or all outcomes of the wagering game via a display device, determining (e.g., via central processing unit (CPU) 30 of FIG. 2) whether to add to one or more or all of the reels 521-525 a symbol clump or a mixture of standard-sized symbols. It may be desirable, for some embodiments, that the determination of whether to add a symbol clump or a mixture of standard-sized symbols be random (e.g., via an RNG). In some aspects, it is randomly determined, on a reel-by-reel basis, whether to add one or more symbol clumps to each of the reels 521-525 in the wagering game 530. In this regard, multiple random determinations may be conducted for each reel to determine whether to add multiple symbol clumps to that reel.

In accord with some aspects, the reel positions borne by each reel are separated into a plurality of subsets, with each subset comprising a predetermined number of reel positions. In some embodiments, all of the subsets contain the same number of reel positions. Further to this example, the number of reel positions contained in each subset may be the same as the number of array positions in the column of the displayed array associated with that reel. With respect to the wagering game of FIGS. 4 and 5, for example, the first reel 421 would be broken down into four subsets, with each subset consisting of five reel positions to correspond with the five array positions 571-575 in the first column of the array 532: subset 1=reel positions A1-A5; subset 2=reel positions A6-A10; subset 3=reel positions A11-A15; and, subset 4=reel positions A16-A20. Likewise, the second reel 422 can be broken down into four subsets each consisting of five reel positions to correspond with the five array positions in the second column of the array 532. A similar process can be conducted for the third, fourth and fifth reels 523, 524, 525, or just one or select ones of the reels 521-525.

Continuing with the above embodiment, the gaming system 500 or gaming terminal 510, or both, will randomly determine, on a subset-by-subset basis, whether to add a symbol clump or a mixture of standard-sized symbols to each of the symbol subsets. In an alternative embodiment, a clump determination can be made for each reel position. If it is determined that a mixture of standard-sized symbols will be added to a particular subset of reel positions, the game sequence may further comprise making a random determination of which standard-sized symbols will be added to that subset. Alternatively, the mixture of symbols may be a predetermined arrangement of standard-sized symbols assigned to that particular subset, or may be selected from a list of predetermined arrangements of standard-sized symbols.

Responsive to a determination to add one or more symbol clumps to one or more of the reels 521-525 in the wagering game 530, some embodiments include determining one or more characteristics of the added symbol clump. The characteristics of the at least one symbol clump may include, in any combination, the type of symbol clump (e.g., standard clump or picture clump), the clump's size, the clump's location, the symbol or symbol(s) that will make up the clump (e.g., WILD symbol(s) or KING symbol or 9-CARD symbol), or any combination thereof. In one non-limiting example, where it is determined that a clump or array of clumps will be added to a respective reel, it is then determined what is the size (i.e., number of occupied reel positions) of each clump. The clump size may be predetermined (e.g., five reel positions to correspond with the number of array positions in the corresponding column of the array), randomly determined (e.g., anywhere between two reel positions and the total number of reel positions on the respective reel), may be designated in accordance with a weighted table (e.g., the weighted table indicates that the next 10 symbols are to be clumped with the same symbol), may be designated within a predetermined range (e.g., 2-10 reel positions), or may be selected from a group of predetermined clump lengths (e.g., 2, 3, 5 or 7 reel positions), or any logical combination thereof. In yet another optional configuration, the characteristics of all added clumps (e.g., size, location, symbol, etc.) can be fixed and unchangeable.

In another non-limiting example of determining clump characteristics, it can also be determined, in instances where a clump will be added to a reel, the location on that particular reel (i.e., which reel positions) at which the clump will be placed (i.e., the clump's location). According to various aspects, each clump is assigned to a random location along a respective reel. Alternatively, the location of the clump may be restricted by the nature of the determination process. In the above-described subset-by-subset determination sequence, for example, when it is determined to add a clump to a subset, the clump location is restricted to the location of the subject of reel positions.

According to some aspects of the present concepts, determining whether or not to add a symbol clump includes conducting a separate random determination sequence for each of the reels 521-525. By way of illustration, and not limitation, a first random determination determines whether to add at least one symbol clump to the first reel 521, and a second random determination determines whether to add at least one symbol clump to the second reel 522. This may be extended to include conducting a third random determination of whether to add at least one symbol clump to the third reel 523, conducting a fourth random determination of whether to add at least one symbol clump to the fourth reel 524, and conducting a fifth random determination of whether to add at least one symbol clump to fifth third reel 525. According to some aspects of the present concepts, the probability of each reel being assigned a symbol clump is the same. In an alternate embodiment, the probability of each reel being assigned a symbol clump varies from reel to reel and, optionally, from subset to subset and, as a further option, from reel position to reel position.

Although it is often desirable that the execution of the aforementioned determination sequence(s) be systematic (e.g., executed during every play, during every other play, etc.), the determination itself is random and arbitrary in some embodiments. In various aspects, the determination of whether to add one or more symbol clumps to one or more of the reels is prior to evaluating the wagering-game outcome to determine if the wagering-game outcome includes at least one winning outcome (e.g., a winning symbol combination). The determination of whether to add a symbol clump is, in some configurations, substantially contemporaneous with the random determination of the wagering-game outcome. In yet other embodiments, the determination of whether to add one or more symbol clumps to one or more of the reels is prior to the random determination of the wagering-game outcome. Additional information regarding the randomized clumping of symbols can be found, for example, in commonly owned U.S. patent application Ser. No. 13/280,479 (corresponding to U.S. Patent Appl. Pub. No. 2012/0115570 A1), to Shawn C. Collette et al., which is incorporated herein by reference in its entirety and for all purposes.

In accordance with other aspects of the disclosed concepts, each picture clump can be treated as a number of adjacent standard-sized symbols for purposes of configuring reel strip layout and/or reel position weightings to ensure that the picture clump only lands flush in the displayed array. As an example, the fourth reel 524, which is shown in FIG. 5 with a picture clump 541 that occupies four reel positions 6D-9D, can be treated as four adjacent standard-sized symbols. The standard-sized symbols surrounding a picture clump, in some embodiments, are then segregated into symbol groups, with each symbol group comprising a number of standard-sized symbols corresponding to the number of reel positions occupied by the picture clump. In accordance with this example, the standard-sized symbols above and below the picture clump 541 are then segregated into two symbol groups each comprising four reel positions: a first symbol group 543 includes reel positions 2D-5D, and a second symbol group 545 includes reel positions 10D-13D. For some implementations, each of the reel positions in the symbol groups can be a mystery (MYST) symbol that is replaced by a random symbol (e.g., in any of the manners described above), or each symbol group can be a predetermined pattern of standard-sized symbols.

Further to the above example, the entire reel strip 524 can be segmented into groups of equal number reel positions (e.g., four reel positions per group), with each group either being occupied by a symbol/picture clump or a collection of (random or fixed) standard sized symbols. In the same vein, all of the reel strips can be segmented into groups of equal number reel positions, with each group either being occupied by a symbol/picture clump or a collection of (random or fixed) standard sized symbols. The number of reel positions in each group can correspond to the number of array positions in the column of the array associated with that reel.

To ensure that the picture clump 541 of FIG. 5 is displayed in its entirety in a displayed array when part of a randomly determined wagering-game outcome, the reels positions of the picture clump 541 and the symbol groups 543, 545 are weighted as follows:

| | |
|---|---|
| 2D | 1 |
| 3D | 0 |
| 4D | 0 |
| 5D | 0 |
| 6D | 1 |
| 7D | 0 |
| 8D | 0 |
| 9D | 0 |
| 10D | 1 |
| 11D | 0 |
| 12D | 0 |
| 13D | 0 |

In this example: the column of the displayed array which corresponds to the fourth reel 524 would consist of four array positions; a 1 indicates that that reel position can occupy the first array position in the column of the displayed array with which the fourth reel 542 is aligned; and, a 0 indicates that that reel position cannot occupy the first array position in the corresponding column of the array. By weighting the reel positions in this manner, we achieve the desired effect.

Notably, there may be a dependency of the expected value (EV) of the wagering game on the particular paylines that are active since, for example, the first reel position in each symbol group (e.g., reel positions 2D and 10D in the above example) never lands on the bottom array position of the array, the second-from-bottom array position or the third-from-bottom array position. As such, separate calculations may be needed for each payline to eliminate the line dependency with a particular reel strip layout. By way of explanation, the probability that a particular reel position lands on a particular array position in a game outcome helps to define the probabilities that the reel positions above and below that reel position will land in any of the array positions. For example, the probability that reel position 562 in FIG. 4 lands in the second array position 572 will help to define the probability that the reel position 561 will land in the first array position 571, and the probability that the reel position 563 will land in the third array position 573. Since each payline typically extends through a specific array position for each reel, there is a possibility that each reel position on a given reel will have different probabilities of landing on the different available paylines. As an example, the following reel positions of FIG. 4 may have the following weights:

| | |
|---|---|
| 561 | 1 |
| 562 | 2 |
| 563 | 3 |
| 564 | 4 |
| 565 | 5 |

where reel position 562 will occupy array position 572 with weight 2 (reel position 562's weight), will occupy array position 573 with weight 1 (reel position 561's weight), and will occupy array position 571 with weight 3 (reel position 563's weight). Thus, reel position 562 will land on a payline that extends through array position 572 with weight 2, a payline that extends through array position 573 with weight 1, and a payline that extends through array position 571 with weight 3. So the frequency at which winning symbol combinations with reel position 562 depends on which payline are being played. This could make the EV line dependent, which is generally considered to be a non-favorable situation.

The prior art approach to eliminating this "line dependency" is to set the weight of each reel position to be the same for each array position. The easiest way to do this is to just have every reel position on the reel strip have the same weight. However, this may not be possible in the disclosed configurations. Some possible alternatives to eliminate "line dependency" is to: (1) instead of having fixed reel strips, randomly assign symbols to the reel positions in such a way that every symbol has the same probability of occupying each array position in the corresponding column of the array; or (2) distribute the symbols on the reel strips such that, when the total weight of each type of symbol for a reel strip is determined, they add up to the same value for the array positions in the corresponding column of the array.

In some embodiments, the wagering game can provide enhanced award values for completing a picture clump montage: creating an enlarged pictorial composition by juxtaposing two or more picture clumps. This could include a predetermined enhanced award for achieving a game outcome with a predetermined number of adjacent and/or matching picture clumps. Awards can be further increased for each additional picture clump that is included in the final montage (e.g., a 2× award multiplier is applied to a montage with two picture clumps, a 3× award multiplier is applied to a montage with three picture clumps, etc.) This concept could optionally or alternatively include a predetermined enhanced award for achieving a game outcome with complementary or matching adjacent picture symbols (e.g., picture symbols that interact with each other when aligned in a game outcome). For some implementations, evaluating game outcomes based on whether a player has achieved a particular picture clump montage helps to eliminate the EV dependence on paylines, which is discussed above.

The wagering game can also provide enhanced award values for forming sub-patterns in the game outcomes. For example, if a player achieves sequence of low symbols on one reel (e.g., A A S1 S2) and a sequence of low symbols on the adjacent reel (e.g., A A S3 S4), the wagering game can provide an enhanced award for achieving an "Ace Square" symbol combination for the following pattern on adjacent reels:

| | |
|---|---|
| A | A |
| A | A |
| S1 | S3 |
| S2 | S4 |

In this regard, the layouts of the reel strips could be configured to form a variety of such geometric patterns: squares, triangles, rectangles, etc.

In some embodiments, all of the symbol clumps borne by one or more or all of the reels are picture clumps. For some embodiments, all of the symbol clumps borne a particular reel are the same length as the corresponding column of the array within which that reel spins. Some embodiments may require all of the reel positions be populated by fixed symbols. Alternatively, for some implementations, all of the reel positions are populated by randomly determined symbols. Optionally, some of the reel positions are populated by fixed symbols (e.g., all reel positions occupied by a symbol clump are fixed and unchanging), whereas some of the reel positions are populated by randomly determined symbols (e.g., all reel positions occupied by standard-sized symbols are randomly populated for each spin).

There are other methods within the scope of this disclosure to ensure that a clump only lands in its entirety in the array when part of a wagering-game outcome. According to one example, the wagering game is provided with a primary set of symbol-bearing reels and a secondary set of symbol-bearing reels, which includes a variety of picture clumps and blank reel positions that are translucent or transparent. All of the picture clumps are the same size/length, and are either immediately adjacent one another on a reel or spaced apart by a number of reel positions that corresponds to the size/length of the picture clumps. So, if all of the picture clumps occupy four reel positions, for example, all the picture clumps are either adjacent (i.e., zero reel positions between two clumps) or multiples of four reel positions apart (e.g., 4, 8, 12, etc. reel positions between two clumps). At the beginning of play of the wagering game, the secondary reels with picture clumps and blank reel positions can be spun and stopped to determine how they will land—i.e., revealing either a picture clump or all blank/empty reel positions. These secondary reels are then overlaid or "spliced" on top of the primary reels in such a way that the picture clumps of the secondary reels cover the primary reels such that, to a player, it appears that there is just one set of reels. The secondary reels are then configured in any of the manners discussed herein to ensure that the picture clumps land flush with respect to the displayed array.

Figure 6:
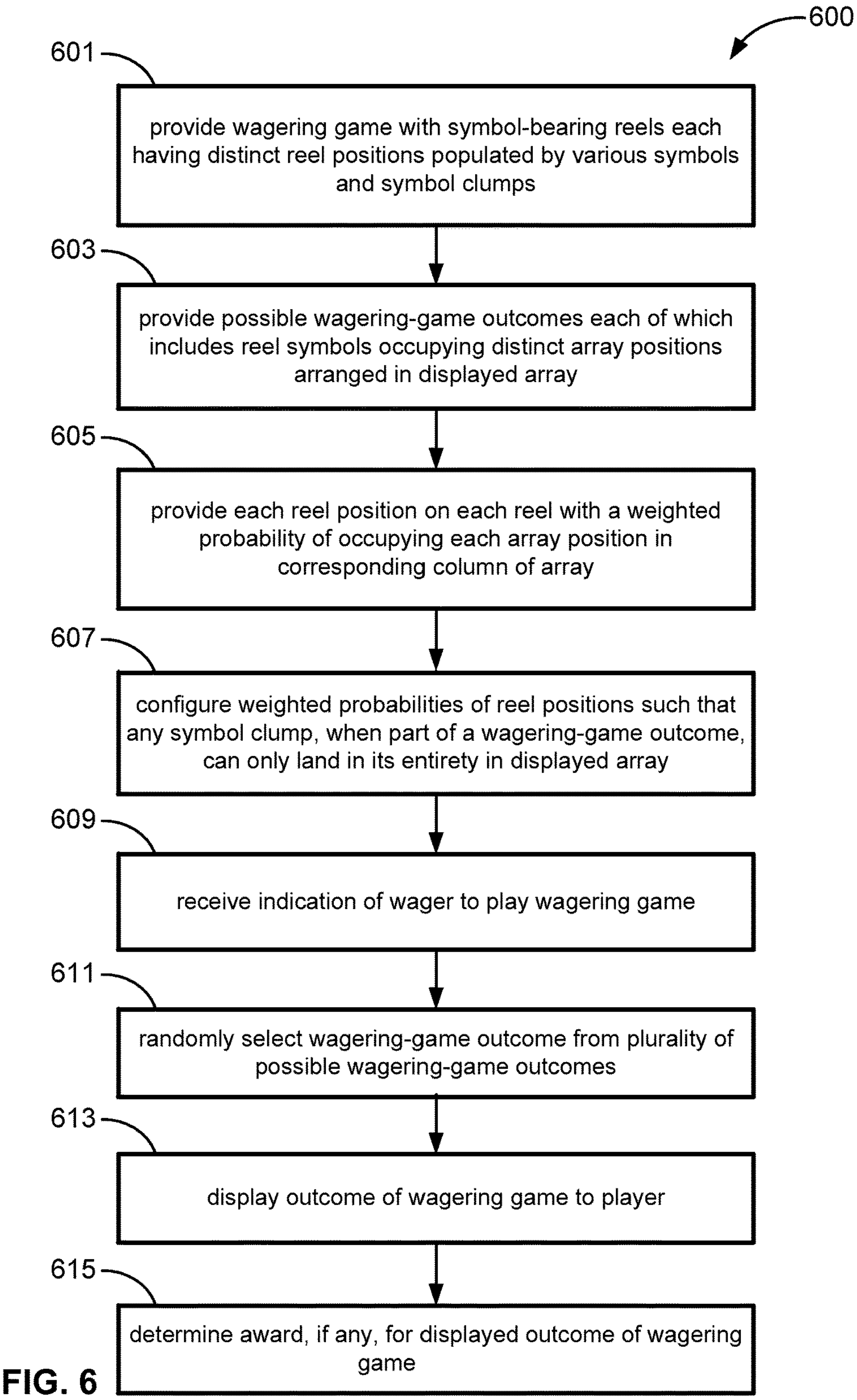
FIG. 6 is a flowchart for an exemplary method or algorithm that can correspond to instructions that can be stored on one or more non-transitory computer-readable media and can be executed by one or more controllers in accord with aspects of the disclosed concepts.

With reference now to the flow chart of FIG. 6, an improved method for conducting a wagering game on a gaming terminal and/or a gaming system, such as those shown in FIGS. 1-5, for example, is generally described at 600 in accordance with aspects of the present disclosure. FIG. 6 can be representative of an algorithm that corresponds to at least some instructions that can be stored, for example, in main memory 32 of FIG. 2, and executed, for example, by the CPU 30 and/or external system(s) 48 of FIG. 2 to perform any or all of the above or below described functions associated with the disclosed concepts. The method 600 will be described with reference to the various aspects and features shown in FIGS. 4 and 5 of the drawings; such reference is being provided purely by way of explanation and clarification.

The method 600 starts at block 601 with providing a wagering game that includes a number of symbol-bearing reels, each of which has a plurality of distinct reel positions populated by various symbols and symbol clumps. Examples of such a wagering game, including an assortment of features, options and alternatives, have been described in extensive detail hereinabove with reference to FIGS. 1-5. FIG. 4, for example, presents a slot-type wagering game 530 which includes a plurality of symbol-bearing reels 521-525 each having a plurality of distinct reel positions (e.g., reel positions 561-565 and 590-594) populated by a mixture symbols (e.g., symbols 566-569) and symbol clumps (e.g., clumps 576-578).

At block 603, the method 600 further comprises providing some or all of the possible wagering-game outcomes for the aforementioned wagering game. As described in the exemplary embodiments of FIGS. 3 and 4, many of the wagering game outcomes are visually depicted to the player with predetermined reel symbols occupying distinct array positions arranged in a displayed array. The wagering game 530 is shown in FIG. 4 after play of a base game segment has been initiated and completed. The reels 521-525 will typically be shown as spinning and stopping to reveal in the displayed array 532 reel symbols which represent a randomly selected outcome of the wagering game 530. Prior to, contemporaneous with, or after revealing the wagering-game outcome to the player, the outcome is evaluated for winning symbol combinations to determine if the displayed outcome has one or more awards associated therewith.

The method continues to block 605 with providing each reel position on each reel with a weighted probability of occupying each array position in the column of the displayed array that corresponds with that reel. The process of assigning weighted probabilities to reel positions, as set forth in block 605, can mimic any of the processes of assigning weighted probabilities described above in the discussion of FIGS. 4 and 5. Alternative embodiments can employ other conventional methods of assigning weighted probabilities to reel positions. At block 607 of FIG. 6, the weighted probabilities assigned to the reel positions are configured such that one or more or all of the symbol clumps or, in some preferred implementations, all picture clumps only land in their entireties in displayed array when part of a wagering-game outcome. Various ways of configuring the weighted probabilities of the reel positions to achieve this objective are described above in the discussion of FIGS. 4 and 5. In some embodiments, blocks 601-607 of the method 600 can be subsumed into a single block or step. For some implementations, the above-described “providing” steps merely require accessing such wagering games and their corresponding features from a database, server, computer system, onboard memory device, external memory device, gaming network, singly or in any combination.

The method 600 continues to block 609 with receiving (e.g., via an input device such as touch screen 18, bill validator 22, information reader/writer 24, etc.) an indication of a wager to play the wagering game. At block 611, an outcome of a base-game portion (or, alternatively, a bonus-game portion, a progressive-game portion, a community-game portion, etc.) of the wagering game is randomly determined. This may include, as indicated above, an RNG generating a random number, game logic for determining the outcome based on the randomly generated number, and the CPU 30, the external system 48, or both, in alternative embodiments, operating to execute a wagering game program, and game assets (e.g., art, sound, etc.) for presenting the determined outcome to a player in a visual manner. The method 600 then displays the base-game outcome of the wagering game to the player at block 613. The base-game outcome of the wagering game can be visually represented by a plurality of symbols arranged on a display device, such as the symbols on the slot reels 521-525 that are arranged in the symbol array 532 of FIG. 4. Block 615 then requires determining whether there is an award associated with the displayed outcome of the wagering game.

In some embodiments, the method 600 includes at least those steps enumerated above. It is also within the scope and spirit of the present invention to omit steps, include additional steps, and/or modify the order presented above. It should be further noted that the method 600 illustrated in FIG. 6 can be representative of a single sequence for playing a wagering game. However, it is expected that the method 600 will be practiced in a systematic and repetitive manner.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

It should be noted that the algorithms illustrated and discussed herein as having various modules or blocks or steps that perform particular functions and interact with one another are provided purely for the sake of illustration and explanation. It should be understood that these modules are merely segregated based on their function for the sake of description and represent computer hardware and/or executable software code which can be stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While many embodiments and modes for carrying out the present invention have been described in detail above, those familiar with the art to which this invention relates will recognize various alternative designs and embodiments for practicing the invention within the scope of the appended claims.

What is claimed is:

1. A gaming system, comprising:

a gaming machine primarily dedicated to playing at least one casino wagering game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to an input indicative of a wager covered by the credit balance, direct the electronic display device to display an outcome of the casino wagering game via an array comprising a plurality of array positions, the casino wagering game including at least one symbol-bearing reel having a plurality of reel positions occupied by symbols, the symbols including at least one picture clump occupying two or more adjacent reel positions of the plurality of reel positions, determine a game outcome from a plurality of available game outcomes, populate the array with a subset of the plurality of symbols to present the game outcome on the electronic display device, the plurality of reel positions having weighted probabilities configured such that the at least one picture clump, when part of the game outcome, is only displayed in its entirety in the array, and receive, via at least one of the one or more electronic input devices, a cashout input that initiates a payout from the credit balance.

2. The system of claim 1, wherein the at least one symbol-bearing reel is aligned with a column of Y array positions of the plurality of array positions, the at least one picture clump is a single, enlarged symbol that occupies X adjacent reel positions of the at least one symbol-bearing reel, wherein the weighted probabilities cause the lower-most reel position of the picture symbol to be displayed in a lower-most array position through an N array position immediately above the lower-most array position, and wherein N=Y−X.

3. The system of claim 1, wherein the one or more controllers are further configured to provide an award when a full picture including the at least one picture clump and another symbol is completed across the at least one symbol-bearing reel and at least one other symbol-bearing reel.

4. The system of claim 3, wherein, based on the weighted probabilities configured to display the at least one picture clump only in its entirety in the array, a probability of completing the full picture is increased.

5. The system of claim 3, wherein the casino wagering game includes another symbol-bearing reel adjacent to the at least one symbol-bearing reel, the another symbol-bearing reel having another plurality of reel positions including at least one other picture clump occupying two or more adjacent reel positions of the another plurality of reel positions, the at least one other picture clump interacting with the at least one picture clump when both picture clumps are displayed in the array.

6. The system of claim 3, wherein the at least one picture clump is displayed adjacent to at least one other picture clump on an adjacent symbol-bearing reel to complete the full picture.

7. The system of claim 1, wherein the array positions are arranged in rows and columns, the at least one symbol-bearing reel being aligned with a respective one of the columns, the at least one picture clump occupying X adjacent reel positions of the plurality of reel positions and the respective column comprising Y of the array positions, X being less than or equal to Y.

8. The system of claim 1, wherein the casino wagering game includes another symbol-bearing reel, the another symbol-bearing reel having another plurality of reel positions occupied by other symbols, the other symbols including at least one other picture clump occupying two or more adjacent reel positions of the another plurality of reel positions, a total number X of adjacent reel positions occupied by the at least one other picture clump being the same number as a total number X of adjacent reel positions occupied by the at least one other picture clump.

9. The system of claim 8, wherein the array positions are arranged in rows and columns, the at least one symbol-bearing reel and the another symbol-bearing reel being aligned with respective columns, each of the respective columns comprising Y of the array positions, the total number X of adjacent reel positions being the same as Y.

10. The system of claim 1, wherein the plurality of reel positions of the at least one symbol-bearing reel is separated into plural reel position subsets each comprising a predetermined plurality of the reel positions, the one or more controllers being further configured to randomly determine, on a subset-by-subset basis, whether to add a picture clump or a mixture of standard-sized symbols to each of the reel position subsets.

11. A gaming machine primarily dedicated to playing at least one casino wagering game, comprising:
an electronic display device coupled to a gaming cabinet;
one or more electronic input devices coupled to the gaming cabinet; and
one or more controllers configured to:
detect, via at least one of the one or more electronic input devices, a physical item associated with a monetary value that establishes a credit balance;
initiate a casino game in response to an input received from one of the one or more electronic input devices,
randomly determine a subset of reel positions of a plurality of reel positions on symbol-bearing reels according to weighted probabilities, the symbol-bearing reels including at least one reel having a picture clump occupying two or more adjacent reel positions on the at least one reel, the weighted probabilities being configured such that the picture clump occurs in the subset only in its entirety,
direct the electronic display device to display the symbol-bearing reels spinning and stopping to present the determined subset via an array comprising a plurality of array positions.

12. The gaming machine of claim 11, wherein the picture clump occupies X adjacent reel positions on the at least one symbol-bearing reel, the array includes a column of at least X array positions aligned with the at least one symbol-bearing reel, and wherein the weighted probabilities cause the at least one picture clump to be displayed in X array positions of the at least X array positions in the column.

13. The gaming machine of claim 12, wherein the weighted probabilities further cause the upper-most reel position of the picture clump to be displayed in the upper-most array position of the column.

14. The gaming machine of claim 12, wherein the weighted probabilities further cause the lower-most reel position of the at least one picture clump to be displayed in the lower-most array position of the column.

15. The gaming machine of claim 12, wherein the plurality of symbol-bearing reels includes another symbol-bearing reel adjacent to the at least one symbol-bearing reel, the another symbol-bearing reel including at least one other picture clump occupying two or more adjacent reel positions of the another symbol-bearing reel, and wherein the one or more controllers are further configured to cause the at least one other picture clump to visually interact with the picture clump when both picture clumps are displayed in the array.

16. A method of operating a gaming system, the gaming system including one or more controllers and a gaming machine, the gaming machine primarily dedicated to playing at least one casino wagering game, the gaming machine including an electronic display device and one or more electronic input devices, the method comprising:
detecting, via at least one of the one or more electronic input devices, a physical item associated with a monetary value that establishes a credit balance;
initiating a the casino wagering game in response to an input indicative of a wager covered by the credit balance;
directing the electronic display device to display an outcome of the casino wagering game via an array comprising a plurality of array positions, the casino wagering game including at least one symbol-bearing reel having a plurality of reel positions occupied by symbols, the symbols including at least one picture clump occupying two or more adjacent reel positions of the plurality of reel positions;
determining a game outcome from a plurality of available game outcomes;
populating the array with a subset of the plurality of symbols to present the game outcome on the electronic display device, the plurality of reel positions having weighted probabilities configured such that the at least one picture clump, when part of the game outcome, is displayed only in its entirety in the array; and
receiving, via at least one of the one or more electronic input devices, a cash out input that initiates a payout from the credit balance.

17. The method of claim 16, wherein the at least one picture clump occupies X adjacent reel positions on the at least one symbol-bearing reel, the array includes a column of at least X array positions aligned with the at least one symbol-bearing reel, and wherein the weighted probabilities cause the at least one picture clump to be displayed in X array positions of the at least X array positions in the column.

18. The method of claim 17, wherein the weighted probabilities further cause the upper-most reel position of the at least one picture clump to be displayed in the upper-most array position of the column.

19. The method of claim 17, wherein the weighted probabilities further cause the lower-most reel position of the at least one picture clump to be displayed in the lower-most array position of the column.

20. The method of claim 16, wherein the plurality of symbol-bearing reels includes another symbol-bearing reel adjacent to the at least one symbol-bearing reel, the another symbol-bearing reel including at least one other picture clump occupying two or more adjacent reel positions of the another symbol-bearing reel, the method further comprising having the at least one other picture clump visually interact with the at least one picture clump when both picture clumps are displayed in the array.

* * * * *